Aug. 26, 1969    J. MURPHY, JR    3,463,032
POWER STEERING INDICATION FOR AUTOMOBILES
Filed May 23, 1966    2 Sheets-Sheet 1
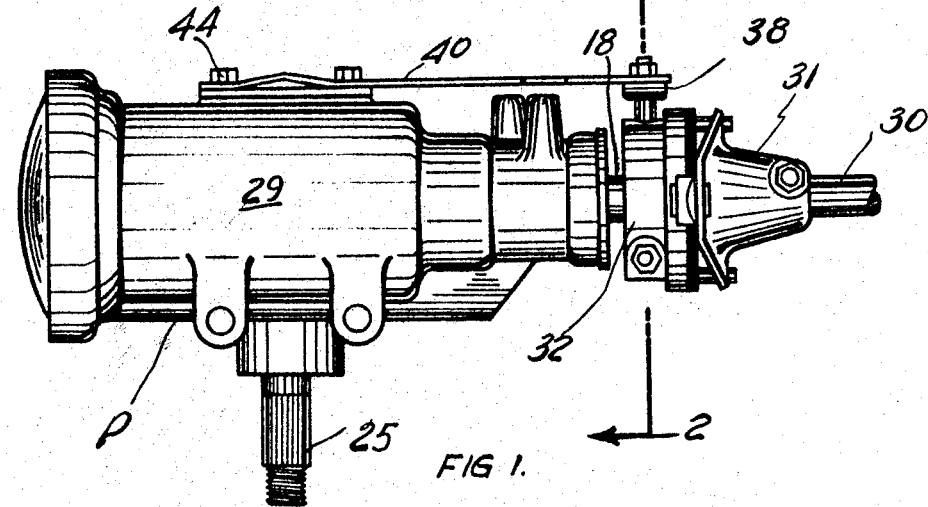
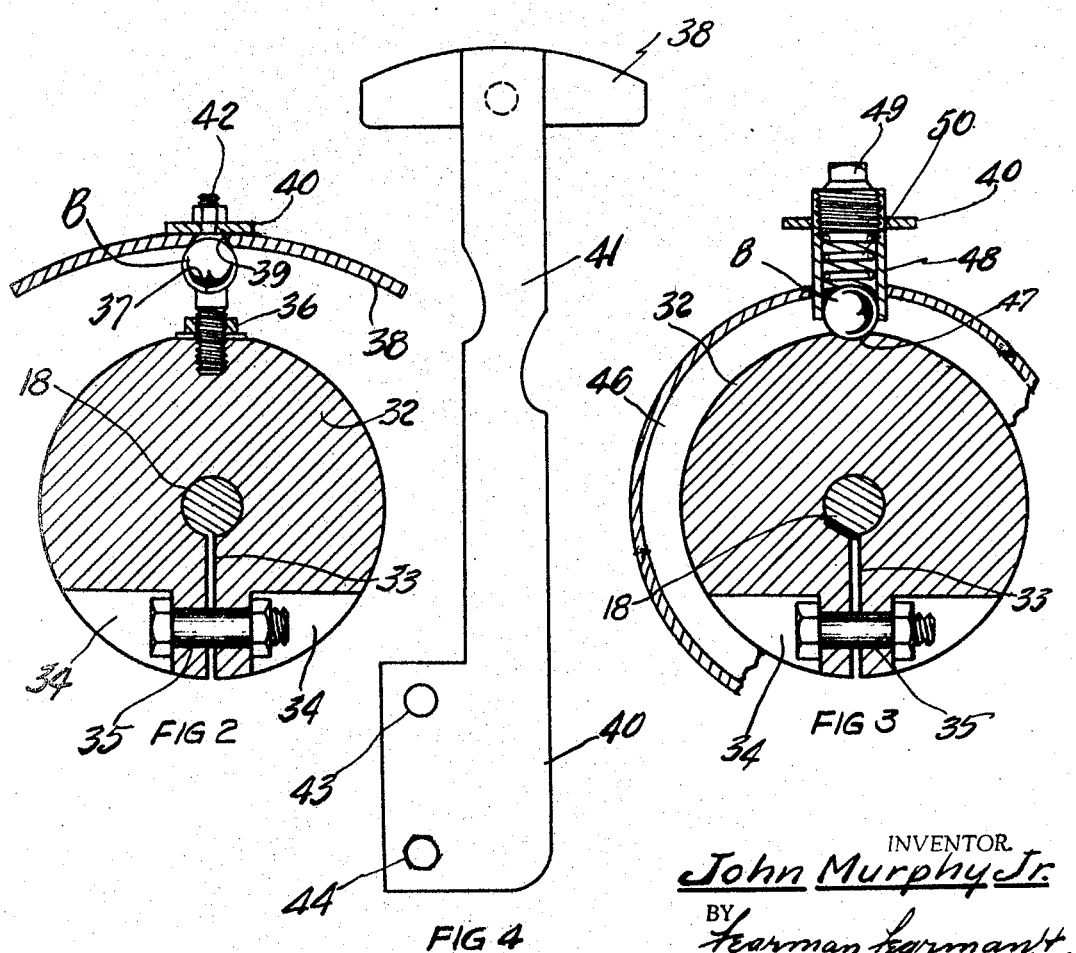
INVENTOR.
John Murphy Jr.
BY Fearman Fearman +
McCulloch Aug. 26, 1969                J. MURPHY, JR                3,463,032
POWER STEERING INDICATION FOR AUTOMOBILES
Filed May 23, 1966                              2 Sheets-Sheet 2
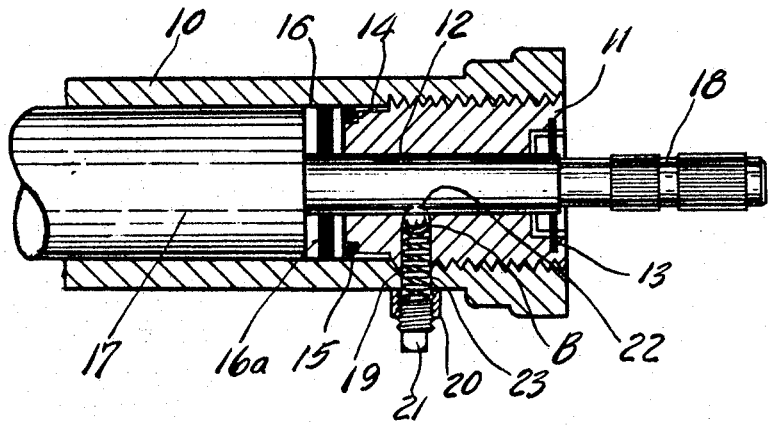
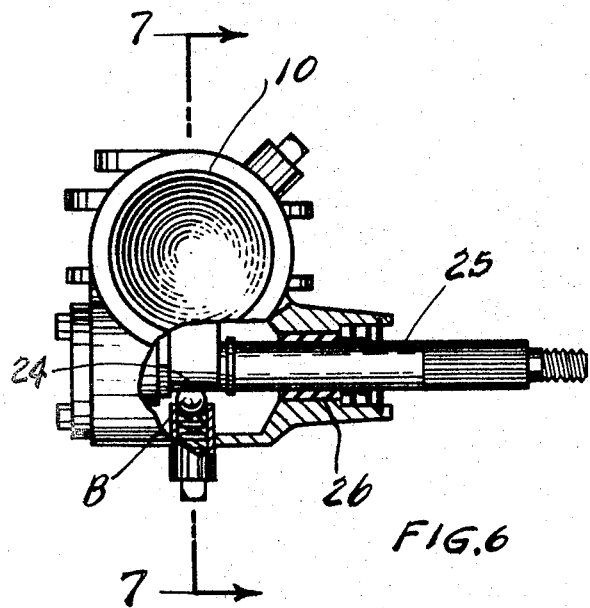
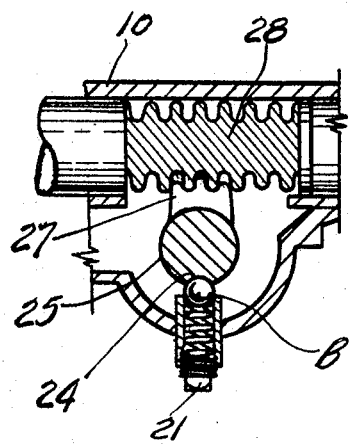
INVENTOR.
John Murphy Jr.
BY
Karman Karman &
McCulloch
Attorneys United States Patent Office 3,463,032
Patented Aug. 26, 1969

3,463,032
POWER STEERING INDICATION
FOR AUTOMOBILES
John Murphy, Jr., 100 Parkwood Court,
Bay City, Mich. 48706
Filed May 23, 1966, Ser. No. 552,210
Int. Cl. B62d 1/16, 5/00
U.S. Cl. 74—495                           4 Claims

ABSTRACT OF THE DISCLOSURE

Apparatus for providing an indication to a vehicle operator that the vehicle wheels are turning from a straight line of travel. The apparatus includes socket and detent means used in combination with either the input or output shafts of a power steering unit.

---

This invention relates to power steering for automotive vehicles, and more particularly to a safety feature that will indicate, by "feel," to the driver that the vehicle steering wheel is being turned off dead center, either to the right or to the left.

Automotive equipment as presently manufactured and marketed has been continuously improved, and at least 70% of the automobiles manufactured each year are equipped with power steering, and these automobiles are so designed that with the assistance of present day power steering, after a right or left-hand turn, while driving forward, the front wheels will almost automatically return to position for straight line forward travel. The present invention herein referred to is a safety feature for use in connection with power steering units, it is not a self-steering mechanism. It is an apparatus that alerts the driver by "feel" that the steering wheel is being turned by the driver when he or she turns his or her head, while talking or viewing objects of interest along the roadway, and ofttimes the driver turns his or her body, at the waistline, for the same general purpose, and in so doing unintentionally turns the steering wheel in the same direction the head and/or body of the driver is turned.

Power steering today operates so free and easy that the driver does not notice or realize that he or she is turning the steering wheel and pulling out of the proper lane of traffic when turning his or her head or body. A six-to-ten-inch turn of the present day steering wheel will change the course of the automobile from 10 to 15 degrees, causing it to very quickly ram into an oncoming line of traffic, etc., causing head-on and/or side-swipe collisions and other accidents.

Modern power steering units as applied to automotive vehicles presently in general use are so accurately manufactured and balanced that manipulation of the steering wheel is almost effortless, so much so that the driver is unaware that he or she is turning the steering wheel. It is, therefore, one of the prime objects of the invention to provide means for creating a "drag" and an "impulse" on the steering wheel, making it necessary that the driver exert added pressure on the wheel to steer the vehicle off dead center, and this added pressure or effort serves as a warning that he or she is moving out of his or her lane of traffic with the danger or ramming or sideswiping other vehicles.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit, or sacrificing any of the advantages of the invention.

In the drawings:

FIG. 1 is a diagrammatic side elevational view of a power steering unit with a centering bar mounted in position thereon.

FIG. 2 is an enlarged transverse sectional view taken on the line 2—2 of FIG. 1.

FIG. 3 is a view similar to FIG. 2 showing a slightly different ball mounting according to another embodiment.

FIG. 4 is an enlarged plan view of the centering bar.

FIG. 5 is a sectional side elevational view showing the centering ball in engagement with the steering gear stub shaft according to another embodiment.

FIG. 6 is a part sectional view showing the pitman shaft assembly, and the centering ball according to another embodiment.

FIG. 7 is a fragmentary transverse sectional view taken on the line 7—7 of FIG. 6.

The accompanying drawings show various ways and places of mounting the feature herein referred to in power steering units presently being manufactured, and also to units that can be applied to the power steering units of vehicles presently in use.

Referring now more specifically to FIG. 5 of the drawings, one of the preferred embodiments of my invention is shown incorporated in new power steering units presently being manufactured. However, the variations shown in the accompanying figures are all basically the same and operate in exactly the same manner, and I do not deem it necessary to show and describe the power steering unit in detail, as the instant application is directed to any revolvable power steering shaft connected with and operated by the vehicle steering wheel, and is a means for providing a slight, yet noticeable, "drag" on the steering wheel as it is being turned from dead center, and then creating a slight "impulse" on the wheel when the centering ball rides over the edge of the ball-seat as the steering wheel is turning, either intentionally or accidentally, and this "drag" and "impulse" warns the driver that the steering wheel is being turned and the vehicle front wheels directed out of a straight line of travel, with danger of collision, side-swiping oncoming vehicles, or body injury, and this "drag" and "impulse" is a positive warning to the driver of the vehicle that he or she is inadvertently turning the steering wheel.

In the combination shown in FIG. 5 of the drawings there is an internally threaded, hollow power steering housing 10 having an adjusting plug 11 threadedly engaging therewith, a centrally disposed passage 12 is provided in the plug 11 and a bearing assembly 13 is provided in the end section of said adjusting plug. The opposite end of the plug is turned as at 14 and accommodates a ring seal 15; a thrust bearing 16 including seal 16a is interposed between the inner end of the plug and the rotary valve 17, and the input stub shaft 18 which connects to the steering wheel shaft 30 through flexible coupling 31 and 32 is journaled in the plug as usual.

A continuous, radially extending, tubular passage 19 is bored in the plug and housing 10 and 11, respectively, and an internally threaded extension 20 forms a continuation of said bore and is provided with an adjusting screw 21 in the outer end thereof. Extension 20 may be an integral part of housing 10, but is preferably a separate piece secured to the housing 10 in any suitable manner, such as by welding.

A ball-seat 22 is provided in the input shaft 18 and a centering ball B is mounted in said seat, said ball being mounted in the passage 19, and a tension spring 23 is interposed between the ball B and the adjusting screw 21, manipulation of said screw permitting yieldable adjustment as desired.

The steering wheel (not shown), is, of course, actuated in either direction by the vehicle driver, and when turning in either direction from straight ahead travel, the input shaft 18 is actuated by the turning of the steering wheel (not shown). This turning movement, when of sufficient length, forces the centering ball B out of engagement with the ball-seat 22 requiring increased pressure to turn the steering wheel, and this can be adjusted by manipulation of the screw 21 as above stated. When the ball travels over the rim of the ball-seat 22, it creates a "feel impulse" in the driver's hands, all of which serves as a warning that the vehicle wheels are turning out of their straight line of travel; however, the driver can easily and quickly make correction by turning the steering wheel to bring the wheels back to position for straight ahead travel, or hold the wheels on course or turn as directed.

In FIGS. 6 and 7 of the drawings I have shown a slightly different arrangement, the centering ball B is mounted to engage a ball-seat 24 provided in the power steering unit output shaft 25, said shaft extending through a bearing 26, and a pitman shaft gear 27 is provided on the shaft 25 and has toothed engagement with a worm gear 28 as shown.

The centering ball, ball-seat and adjusting means is the same as shown in FIG. 5 of the drawings, and no further explanation is deemed necessary.

In order to apply my safety feature to power steering units presently in use on automobiles already on the market I provide a design shown in FIGS. 1, 2 and 4 of the drawings. FIG. 1 shows a side elevational view of a power steering unit $p$ which comprises a preferably cast housing 29 having an input shaft 18 coupled to a steering shaft 30 as usual. The upper half of the conventional flexible coupling 31 is mounted on the steering shaft 30 and the lower half on shaft 18. A rigid coupling 32 is provided on said shaft 18, said coupling being split as at 33 and being recessed at 34 to accommodate bolts 35 to firmly anchor the coupling on the shaft. In the design shown in FIG. 2 of the drawings, a ball accommodating member 36 is threaded on the outer face of the coupling 32, the outer end of said member being disc-shaped to form seat 37, in which the centering ball B is mounted and secured. A spring plate 38 is provided in the assembly and forms a shield, and a ball seat 39 is provided in the lower face of the spring plate 38, as shown.

A centering bar 40 comprises a relatively thin flat section 41 having the spring plate 38 secured thereto by means of bolt 42 which may suitably be an integral part of plate 38, as shown, and openings 43 are provided in the upper end section to accommodate bolts 44 to secure the centering bar on the bosses 45 cast on the housing 29.

An alternate construction is shown in FIG. 3 in which a grease seal housing 46 surrounds the outer rim of the coupling, a ball seat 47 is provided to accommodate ball B and a tubular sleeve 48 is provided in the housing 46, a tension screw 49 being provided in the upper end of the sleeve and a spring 50 is interposed between the screw and the ball to provide for easy adjustment of the ball, and this above described combination is, in fact, an alternate construction to that shown in FIG. 2.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. In a power steering assembly for wheeled vehicles including a power steering unit having a projecting input shaft and flexible coupling means connecting it with the steering wheel shaft; means fixed on the input shaft and rotatable therewith having a projecting arcuate detent portion; arcuate plate means having a detent socket therein in which said detent is seated when the vehicle wheels are in normal straight ahead position; and means supporting said arcuate plate means on the power steering unit so that when said input shaft is turned by the steering wheel shaft the detent moves out of the detent socket and guides on said arcuate plate means for a portion of the revolution of the shaft after which the detent is free of the arcuate plate means.

2. The combination defined in claim 1 in which the arcuate plate means comprises a spring member; and said supporting means comprises flat centering bar means removably connected to said housing and extending parallel to said input shaft and steering shaft to fix said arcuate plate means in position.

3. In a power steering assembly for wheeled vehicles including a power steering housing having projecting input and output shafts and flexible coupling means connecting the input shaft with the steering wheel shaft; means positioned adjacent one of the power steering unit shafts; and socket and detent means provided between said positioned means and said one shaft, said detent means disengageable when the steering shaft turns the said one shaft.

4. The combination defined in claim 3 in which said socket and detent means and said positioned means is supported by a centering bar connected to said housing and extending parallel to said input shaft and steering wheel shaft.

References Cited

UNITED STATES PATENTS

| | | | |
|---|---|---|---|
| 3,292,499 | 12/1966 | Duffy | 91—368 |
| 1,418,693 | 6/1922 | Bauer | 74—495 |
| 1,520,692 | 12/1924 | Brennan | 74—495 |
| 2,511,908 | 6/1950 | Forbess. | |
| 2,821,173 | 1/1958 | Adsit | 91—368 |
| 3,048,234 | 8/1962 | Zeigler | 180—79.2 |
| 2,182,596 | 12/1939 | Olsen | 74—495 |
| 2,800,190 | 7/1957 | Dvorak | 74—493 X |
| 2,987,936 | 6/1961 | Selle et al. | 74—493 |

FOREIGN PATENTS 698,526  11/1940  Germany.

FRED C. MATTERN, JR., Primary Examiner

CAROLYN F. GREEN, Assistant Examiner

U.S. Cl. X.R.

74—492; 180—79.2